Patented Sept. 10, 1929.

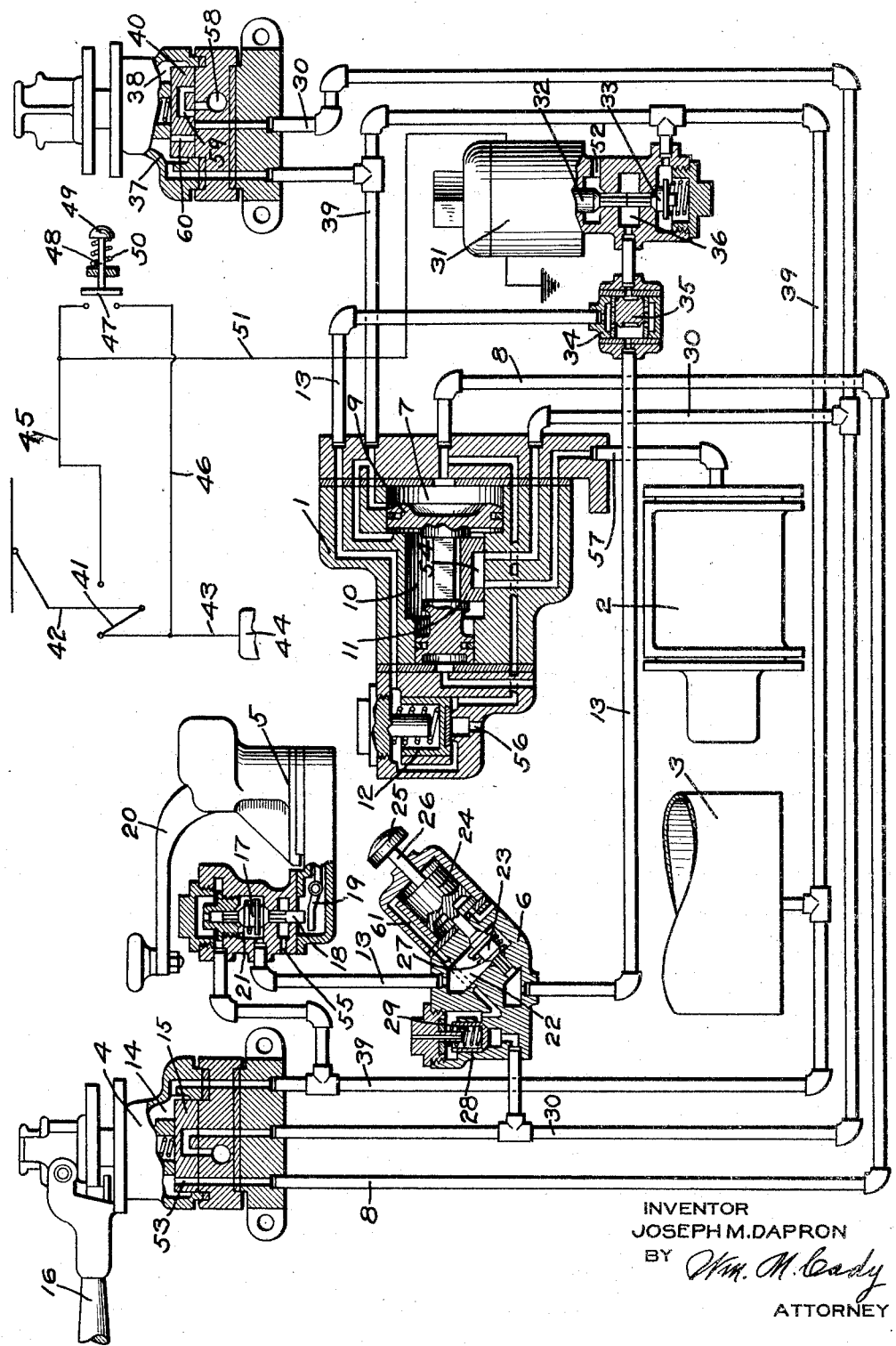

1,727,396

UNITED STATES PATENT OFFICE.

JOSEPH M. DAPRON, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed November 10, 1927. Serial No. 232,320.

This invention relates to fluid pressure brakes, and more particularly to a brake equipment of the safety car control type.

My invention has special reference to a brake equipment known as the single end type, in which the brakes are controllable from one end of the car only.

With a single end control car, it has been proposed to provide means at the rear or non-operating end of the car whereby the power for operating the car may be controlled at the rear end for temporary purposes, such as in backing up on a wye, so as to permit the car to be turned around.

The proposed power controlling means at the rear end includes a push button at the rear or non-operating end which is so connected by wiring that when the usual power controller is left at one or more power points as may be predetermined, by operating the push button, power is provided for moving the car.

With such an arrangement, it is also necessary to insure that the brakes will be applied before the operator leaves the front or operating end of the car and to provide means whereby the brakes may be controlled at the rear end.

One object of my invention is to provide means for controlling the brakes at the rear or non-operating end of a car equipped with a single end brake equipment.

Another object is to provide means for controlling the brakes at both ends of a car equipped with a single end brake equipment, in which the power circuits controlled by a push button at the rear end are utilized to control the brake equipment.

Other objects and advantages will appear in the following more detailed description of the invention.

In the accompanying drawing, the single figure is a diagrammatic view, partly in section, of a safety car fluid pressure brake equipment embodying my invention.

The brake equipment shown in the drawing is of the single end controlled safety car type as heretofore employed and comprising an emergency valve device 1, a brake cylinder 2, a main reservoir 3, a brake valve device 4, a safety controller handle device 5, and a foot valve device 6.

The emergency valve device 1 comprises a casing having a piston chamber 7 connected to an emergency brake pipe 8 and containing a piston 9 and a valve chamber 10 adapted to be charged with fluid under pressure from the main reservoir 3 and containing a slide valve 11 adapted to be operated by piston 9. Associated with the emergency valve device 1 is a relay valve 12 having one side connected to a safety control pipe 13 and operated upon a reduction in pressure in the control pipe for venting fluid from the brake pipe 8.

The brake valve device 4 may comprise a casing having a valve chamber 14 containing a rotary slide valve 15 adapted to be operated by a handle 16.

The safety controller handle device may comprise a casing containing a double beat valve 17 having a stem 18 adapted to be engaged by one end of a pivoted lever 19, the other end of which is operatively connected to the pivoted controller handle 20 in such a way that when the operator releases the handle, the upward pivotal movement thereof operates the lever 19 so as to cause the double beat valve to be shifted to its upper seat, said valve being normally seated against its lower seat by spring 21, when the handle 20 is held depressed.

The foot valve device 6 comprises a casing having a valve chamber 22 containing a double beat valve 23. A piston 24 is operatively connected to the valve 23 and a foot operable push button 25 is connected to piston 24 by a stem 26. Communication through the control pipe 13 is controlled by the double beat valve 23, a spring 27 acting on said valve in a direction tending to maintain the valve in position to open said communication.

Associated in the foot valve device is a valve piston 28 subject to the pressure of a spring 29 and open on its seated area to pressure of fluid in the straight air pipe 30.

In addition to the above described usual equipment of a single end controlled safety car equipment, according to my invention, at the rear or non-operating end of the car there is provided a magnet valve device comprising a magnet 31 and double beat valves 32 and 33 adapted to be operated by said magnet. A double check valve device is provided comprising a casing 34 containing a double check valve 35, having one side open to the control pipe 13 at the foot valve side and having the opposite side connected to a chamber 36 intermediate the valves 32 and 33.

A straight air brake valve device is also provided at the rear end comprising a casing 37 having a valve chamber 38 connected to main reservoir pipe 39 and containing a rotary slide valve 40, the straight air pipe 30 leading to the seat of said valve.

For controlling the magnet 31, the rear end power control circuits as heretofore employed are utilized and as shown in the drawing a double throw switch is provided having a movable switch member 41 with a connection to a trolley current wire 42 and adapted in one position to connect the current supply wire 42 with the current supply wire 43 leading to the usual controller 44 at the operating end of the car. In the other position of the switch, the supply wire 42 is connected to a wire 45 leading to the operating station at the rear end of the car and there is also a wire 46 leading from the controller supply wire 43. The terminals of the wires 45 and 46 are controlled by a movable switch member 47 provided with an operating stem 48 having a push button 49, the circuit switch member 47 being normally held in its open circuit position by a spring 50.

According to my invention, the magnet 31 is connected in circuit with the wire 45 through a wire 51, the other terminal of the magnet being grounded, so that when the switch member 41 is moved to connect the supply wire 42 with wire 45, the magnet 31 will be energized.

In operation, with the controller handle 20 held depressed, the double beat valve 17 is seated on its lower seat and fluid under pressure from the main reservoir 3 is supplied from pipe 39 to control pipe 13 and the foot valve device 6 being in its normal position, the double beat valve 23 is in position permitting flow through the control pipe 13 to the double check valve 35.

When operating the car from the front end, the switch member 41 is in the position shown, in which current is supplied from the trolley to the power controller 44 and the circuit through the wire 45 is open. The magnet 31 is therefore held deenergized, so that the valve 33 is closed and the valve 32 unseated. With valve 32 unseated, the check valve 35 at one side is vented to the atmosphere through an exhaust port 52, so that the pressure of fluid supplied to the control pipe 13 operates to shift the double check valve 35 to the right, permitting flow through the control pipe to the top of the relay valve 12.

The brake pipe 8 is charged with fluid under pressure in the release position of the brake valve device 4, through port 53 in the rotary valve 15, the valve chamber 14 being supplied with fluid under pressure from the main reservoir 3 through pipe 39.

The emergency piston 9 is held in release position, as shown, by brake pipe pressure in piston chamber 7, in which position the brake cylinder 2 is connected to the straight air pipe 30 through cavity 54 in slide valve 11.

If the operator should release the safety controller handle 20, the lever 19 will be operated to shift the double beat valve 17 so that the valve is moved from its lower seat to its upper seat. Fluid under pressure is then vented from the control pipe 13 to atmospheric exhaust port 55 and the relay valve 12 is shifted upwardly by brake pipe pressure acting on its area outside the seat. Fluid is then vented from the brake pipe 8 to the atmosphere through port 56 and the emergency piston is shifted outwardly by the fluid pressure in valve chamber 10, so that the slide valve 11 is shifted to a position in which the brake cylinder pipe 57 is opened to valve chamber 10. Fluid at main reservoir pressure in valve chamber 10 is then supplied to the brake cylinder 2, to effect an emergency application of the brakes.

When the operator desires to go to the rear or non-operating end of the car, he shifts the switch member 41 to its rear end operating position, in which the current supply wire 42 is connected to the wire 45. The magnet 31 is then energized through wire 51 so that the valve 32 is thereby shifted to its seat and the valve 33 is unseated. The unseating of valve 33 permits flow of fluid under pressure from the main reservoir pipe 39 to the right hand face of the double check valve 35, which is thereupon shifted to the left, so that communication is established from the main reservoir pipe 39 to the relay valve side of the control pipe 13. The relay valve 12 is thus held seated by main reservoir pressure and at the same time, communication is cut off from the control pipe section at the foot valve side to the relay valve section of the control pipe. Consequently, the controller handle 20 may be released without effecting an emergency application of the brakes, since the venting of fluid from the control pipe 13 by the movement of valve 17 from its lower seat will not be effective on the relay valve 12.

The operator now operates the brake valve handle 16 so as to effect an application of the brakes, fluid under pressure being supplied in the service application position of the rotary valve 15 from the valve chamber 14 to the straight air pipe 30, whence air flows through the cavity 54 in slide valve 11 to the brake cylinder. The operator now sets the controller 44 to the two point position, or other power position as may be desired, and removes the brake valve handle 16.

When the operator goes to the rear end of the car, he uses the handle 16 as the operating handle of the straight air brake valve. When the operator is stationed at the rear end of the car, he may apply power to the car as desired by pressing the push button 49 so as to close the circuit from the trolley through wire 46 to the controller 44, which being set on a power position, operates in the usual manner to supply current to the car motor.

Before starting the car, the operator releases the brakes by turning the rotary valve 40 of the straight air brake valve to release position, in which the straight air pipe 30 is connected to atmospheric exhaust port 58 through cavity 59 in the rotary valve 40. The magnet 31 remaining energized, the double check valve 35 is maintained in its left hand position, so that venting of fluid from the relay valve 12 by way of the open pilot valve 17 at the front end of the car is prevented by the double check valve.

The brakes may be applied when desired at the rear end of the car by operating the straight air brake valve, so as to cause the rotary valve 40 to be shifted to application position, in which port 60 registers with pipe 30 and consequently fluid under pressure is supplied from the valve chamber 38, which is connected to main reservoir pipe 39, to the straight air pipe 30 and to the brake cylinder.

After the backing up operation is completed and the operator wishes to return to the front end of the car, he first makes a straight air application of the brakes, at the rear end and then removes the brake valve handle 16 in the lap handle off position as shown. When at the front end, he applies the brake valve handle to the brake valve 4 and moves the brake valve to straight air application position and also presses down on the controller handle 20 with the handle in power off position.

When a straight air application of the brakes is made, fluid under pressure is supplied from the straight air pipe 30 to the seated area of the valve piston 28, and said valve piston is thereby lifted from its seat, so that fluid under pressure is supplied, through passage 61, to the outer face of piston 24. Piston 24 is then shifted downwardly, operating the valve 23, so as to cut off communication through the control pipe 13. With the controller handle 20 held depressed, the section of the control pipe 13 to the foot valve device is charged with fluid under pressure.

The switch member 41 is now shifted to its normal operating position, as shown in the drawing, so that current is supplied from the trolley to the controller 44 and thus permitting the controller to be operated in the usual manner for running the car.

When the switch member 41 is shifted to its normal position, the energizing circuit to the magnet 31 is opened, so that the magnet 31 is deenergized, and thereby the valve 33 is permitted to seat and the valve 32 is unseated, thus venting fluid from the right hand face of the double check valve 35.

The check valve 35 may then shift to its right hand position, opening communication from the control pipe section between the foot valve device and the double check valve, to the control pipe section leading to the relay valve 12, but although the section of the control pipe leading to the foot valve device may be at atmospheric pressure, the pressure on the upper face of the relay valve 12 will not be sufficiently reduced by flow to the control pipe section leading to the foot valve device, to cause operation of the relay valve, and consequently an emergency application of the brakes will not be caused.

The brake may now be released by operation of the brake valve device 4 and the car thereafter controlled in the usual manner.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake equipment, the combination with a controller handle and means operated upon release of the handle for effecting an application of the brakes, of electrically controlled means operable manually for preventing an application of the brakes upon release of the controller handle.

2. In a fluid pressure brake equipment, the combination with a controller handle, a control pipe, means operated upon a reduction in pressure in said pipe for effecting an application of the brakes, and means operated upon release of the controller handle for venting fluid from said pipe, of electrically controlled means operable to prevent the operation of said brake applying means upon release of the controller handle.

3. In a fluid pressure brake equipment, the combination with a controller handle, a control pipe, means operated upon a reduction in pressure in said pipe for effecting an application of the brakes, and means operated upon release of the controller handle for venting fluid from said pipe, of electrically controlled means operable to prevent the operation of said brake applying means upon release of the controller handle, and means under the control of the operator for controlling the operation of said electrically controlled means.

4. In a fluid pressure brake equipment, the combination with a control pipe, valve means operated upon a reduction in fluid pressure in said pipe for effecting an application of the brakes, a controller handle and means operated upon depression of the handle for supplying fluid under pressure through said pipe to said valve means and upon release of the handle for venting fluid from said pipe, of electrically controlled means operable to cut off communication through which fluid is vented from said pipe and for supplying fluid under pressure to said valve means.

5. In a fluid pressure brake equipment, the combination with a control pipe and valve means operated upon a reduction in pressure in said pipe for effecting an application of the brakes, of valve mechanism controlled from one side of the car for supplying and releasing fluid under pressure to and from said pipe, electrically controlled means for also supplying and releasing fluid under pressure to and from said pipe, and a double check valve for controlling communication from said valve mechanism and from said electrically controlled means, through said pipe, to said valve means.

6. In a fluid pressure brake equipment, the combination with a control pipe and valve means operated upon a reduction in pressure in said pipe for effecting an application of the brakes, of electrically controlled means for controlling the supply of fluid under pressure to said valve means, a switch device at one end of the car having one position for completing the circuit through which current is supplied to the power controller and another position for closing a circuit controllable at the other end of the car for supplying current to the power controller, a switch device for controlling the last mentioned circuit at the other end of the car, said electrically controlled means being energized by current supplied to the circuit controlled at said other end.

7. In a fluid pressure brake equipment, the combination with a brake pipe, an emergency valve device operated upon a reduction in brake pipe pressure for effecting an emergency application of the brakes, and a brake valve device at one end of the car for controlling the pressure in the brake pipe and operative to effect a straight air application of the brakes, of a straight air brake valve at the other end of the car for controlling only the application and release of the brakes by straight air.

8. A safety car control equipment comprising an emergency valve device operated upon a reduction in fluid pressure for effecting an application of the brakes, a relay valve operated upon a reduction in fluid pressure for effecting a reduction in pressure on said emergency valve device, means under the control of the operator for effecting a reduction in pressure on said relay valve, and electrically controlled means for supplying fluid under pressure to said relay valve.

9. A safety car control equipment comprising an emergency valve device operated upon a reduction in fluid pressure for effecting an application of the brakes, a relay valve operated upon a reduction in fluid pressure for effecting a reduction in pressure on said emergency valve device, a safety controller handle, means operated upon release of the handle for reducing the pressure on said relay valve, and electrically controlled means operative to prevent a reduction in pressure on said relay valve when the controller handle is released.

10. A safety car control equipment comprising an emergency valve device operated upon a reduction in fluid pressure for effecting an application of the brakes, a relay valve operated upon a reduction in fluid pressure for effecting a reduction in pressure on said emergency valve device, a safety controller handle, means operated upon release of the handle for reducing the pressure on said relay valve, and electrically controlled means operative to prevent a reduction in pressure on said relay valve and to supply fluid under pressure thereto when the controller handle is released.

11. A safety car control equipment comprising an emergency valve device operated upon a reduction in fluid pressure for effecting an application of the brakes, a relay valve operated upon a reduction in fluid pressure for effecting a reduction in pressure on said emergency valve device, electrically controlled means operative to prevent a reduction in pressure on said relay valve when the controller handle is released, and a double throw switch having one position for supplying current to the power controller and another position for energizing said electrically controlled means.

In testimony whereof I have hereunto set my hand.

JOSEPH M. DAPRON.